(12) United States Patent
Kleckner

(10) Patent No.: US 7,124,533 B2
(45) Date of Patent: Oct. 24, 2006

(54) AUTOMATIC LOCKING LANDING NET YOKE

(75) Inventor: Ryan J. Kleckner, Grafton, WI (US)

(73) Assignee: Frabill, Inc., Jackson, WI (US)

( * ) Notice: Subject to any disclaimer, the term of this patent is extended or adjusted under 35 U.S.C. 154(b) by 0 days.

(21) Appl. No.: 11/098,877

(22) Filed: Apr. 5, 2005

(65) Prior Publication Data

US 2006/0026890 A1 Feb. 9, 2006

Related U.S. Application Data

(60) Provisional application No. 60/599,607, filed on Aug. 6, 2004.

(51) Int. Cl.
*A01K 77/00* (2006.01)

(52) U.S. Cl. .................................. 43/11; 43/12; 43/7

(58) Field of Classification Search .................... 43/12, 43/11; *A01K 77/00*
See application file for complete search history.

(56) References Cited

U.S. PATENT DOCUMENTS 4,619,065 A * 10/1986 Jones ............................. 43/11

6,408,560 B1 * 6/2002 Bloom ........................... 43/12
6,957,600 B1 * 10/2005 Hu ............................. 81/177.8

* cited by examiner

*Primary Examiner*—Darren W. Ark
*Assistant Examiner*—John D. Holman
(74) *Attorney, Agent, or Firm*—Joseph S. Heino; Patrick M. Bergin

(57) ABSTRACT

An automatic locking landing net yoke includes a channeled ramp feature such that, when the handle is drawn through the yoke and the yoke slides over a spring button, the ramp forces or cams the button downwardly and into the handle. Toward the lowermost portion of the ramp is a hole such that, as the hole in the yoke slides over the spring button, the force of the button extends it upwardly through the hole. The spring button is never pushed completely into the handle because the backside of the yoke hole prevents the yoke from being extended to the point that the yoke slides off the handle. The yoke is also configured such that the yoke allows use with hoop and handle shapes of various configurations and is molded of a material that does not create any oxidation or corrosion between the handle and yoke, thus providing smooth operation between the two elements.

15 Claims, 4 Drawing Sheets

AUTOMATIC LOCKING LANDING NET YOKE

This application claims the benefit and priority of U.S. Provisional Pat. No. 60/599,607 filed Aug. 6, 2004.

FIELD OF THE INVENTION

This invention relates generally to items and accessories used by anglers in the sport of fishing. More particularly, it relates to landing nets of the type that are used by anglers to assist them with catching fish. It also relates to a landing net yoke that has an automatic locking feature incorporated into its design that allows the landing net yoke to be used with an extension handle in a secure way and without the worry of the handle becoming detached from the net during deployment.

BACKGROUND OF THE INVENTION

Although once a means for human survival, fishing in the modern age has evolved into more of a competitive and recreational sport. To increase their chances for a successful outing, modern anglers prefer to utilize equipment and devices that they know will work and that they can rely on. Though not completely fool-proof, many fishing accessories have improved simply because technology and manufacturing methods have improved as well. This makes fishing equipment more reliable and affordable. In the view of this inventor, however, there is always room for improvement of equipment and the traditional landing net is one such piece of equipment that anglers and others have sought to improve over the years. The landing net is one piece of equipment that anglers have used for many years to help reduce the load that is otherwise placed on the angler's lure and on the line that is connected to it when pulling a fish into a boat or onto shore, thereby also reducing the risk of losing the hooked fish.

Landing nets of recent design tend to include three elements: a hoop which supports the net, an extensible handle, and a yoke. The function of the landing net yoke is to provide an attachment means between the hoop and the handle such that the landing net can be readily changed from a stored or collapsed position to an active or extended position by telescoping the handle and locking it into a fixed position relative to the hoop and net. The traditional yoke has been around for over twenty years. The first ones were tube steel or aluminum that was welded together. They progressed to stampings that were fastened together and then to the extruded aluminum that is popular today. Some yokes that require less strength have been injection molded out of polypropylene. Regardless of the design, the traditional operation for all yoked landing nets is the same. The yoke and hoop assembly is slid along the handle to the end position. A spring button within the handle is manually depressed so that the yoke can slide over it. The yoke is then positioned so that the spring button can extend into a hole within the yoke. The yoke is now in a fixed position.

There are, however, disadvantages to the old and currently available yoked landing net assemblies. For example, to move the yoke from its fixed position, the spring button must be manually depressed to allow the yoke to engage it. This takes extra time in a situation that is required to be done as quickly as possible. If the spring button does not line up with the hole in the yoke, the yoke can be over-extended from the handle, thereby disconnecting it from the handle. Another disadvantage is that different yokes are required for each handle and hoop combination. This makes yokes of current design unusable with multiple shapes of handles and hoops. Another disadvantage is that, if the yoke is made of a metallic material, the yoke is susceptible to corrosion or oxidation between the yoke and the handle, which is also typically made of a metallic material.

Accordingly, what is needed is a landing net assembly whereby the handle can be slid into a fixed position without manually activating the spring button, thus making the net easier and quicker to use. What is also needed is an automatic locking yoke designed for use as a part of such a landing net assembly whereby the yoke does not allow the spring button to miss the hole, thus making the net more reliable in use. What is also needed is an automatic locking yoke that is designed for use as a part of such a landing net assembly whereby the yoke geometry allows multiple shapes of hoops and handles to be used, thus making the yoke design much more valuable due to manufacturability. What is also needed is an automatic locking yoke of such design that is manufactured of a material that does not allow corrosion or oxidation between the yoke and the handle.

Accordingly, it is an object of the present invention to provide a new and useful automatic landing net yoke whereby the handle can be slid into a fixed position without manually activating the spring button, thus making the net easier and quicker to use. It is another object to provide such an automatic landing net yoke whereby the yoke does not allow the spring button to miss the hole, thus making the net more reliable in its use. It is yet another object to provide such a yoke whereby the yoke geometry allows multiple shapes of hoops and handles to be used, thus making the yoke design much more valuable due to manufacturability. It is still another object to provide such a yoke whereby the yoke of such design is manufactured of a material that does not allow corrosion or oxidation between the yoke and the handle. Additional objects of the present invention are to provide such a yoke that is lightweight, strong, and no more expensive to produce than currently available parts are, thus making the yoke useful and affordable.

SUMMARY OF THE INVENTION

The automatic locking landing net yoke of the present invention has obtained these objects. It provides for a landing net yoke that includes a channeled ramp feature such that, when the handle is drawn through the yoke and the yoke slides over the spring button, the ramp forces or cams the button downwardly and into the handle. Toward the lowermost portion of the ramp is a hole such that, as the hole in the yoke slides over the spring button, the force of the button extends it upwardly through the hole. In the automatic landing net yoke of the present invention, the spring button is never pushed completely into the handle. In this configuration, the backside of the yoke hole stops or prevents the yoke from being extended to the point that the yoke slides off of the handle. The automatic landing net yoke of the present invention also includes design geometry such that the yoke allows use with hoop and handle shapes of various configurations for use with many product families. The landing net yoke of the present invention is molded out of a polymer, which does not create any oxidation or corrosion between the handle and yoke, thus providing smooth operation between the two elements.

The foregoing and other features of the present invention will be apparent from the detailed description that follows.

DETAILED DESCRIPTION

Figure 1:
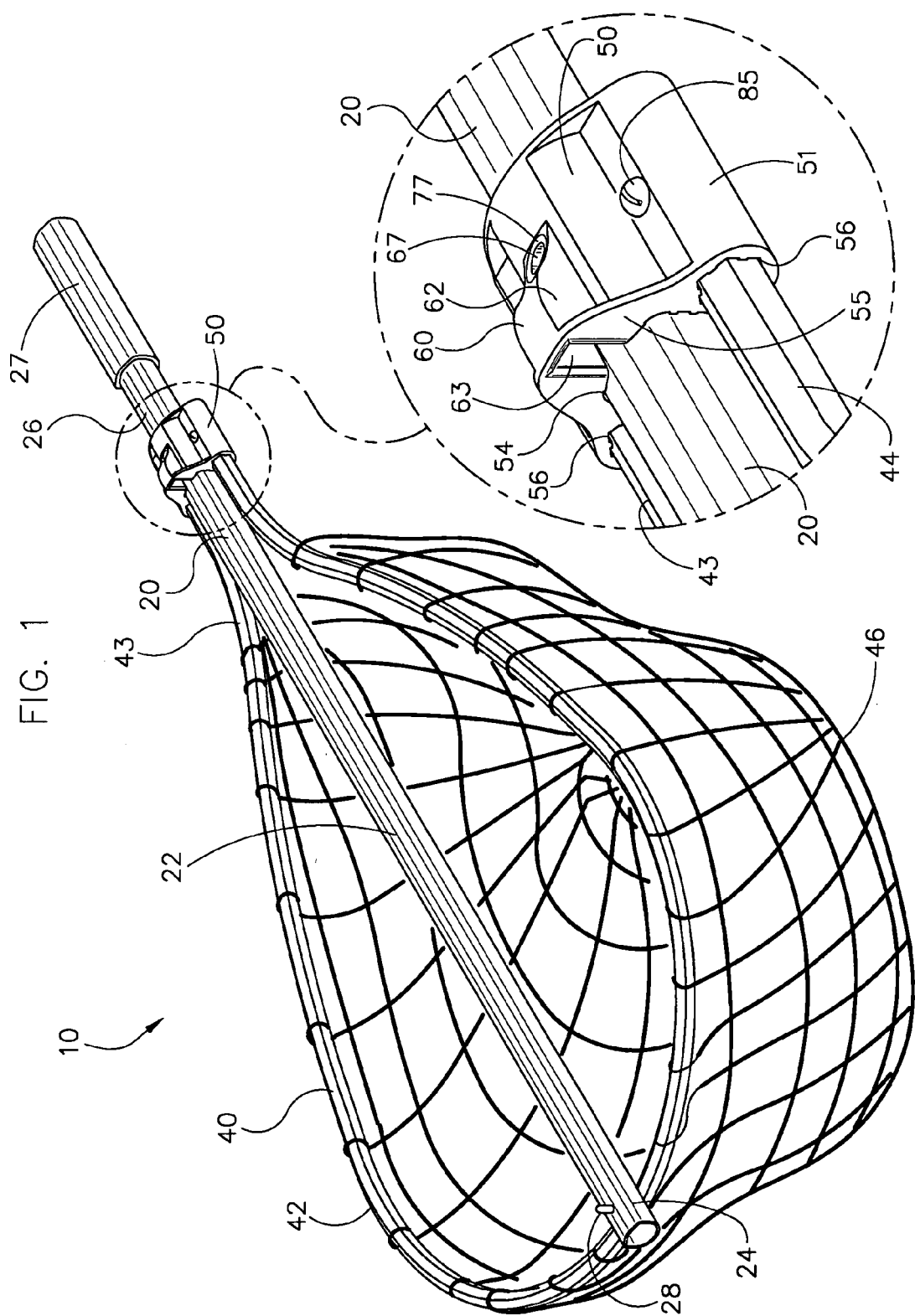
FIG. 1 is a front, top and right side perspective view of a landing net assembly that uses an automatic locking landing yoke constructed in accordance with the present invention, showing the assembly in its "stored" or retracted position. It also includes an enlarged inset view of the automatic landing net yoke illustrated in the assembly.
Figure 2:
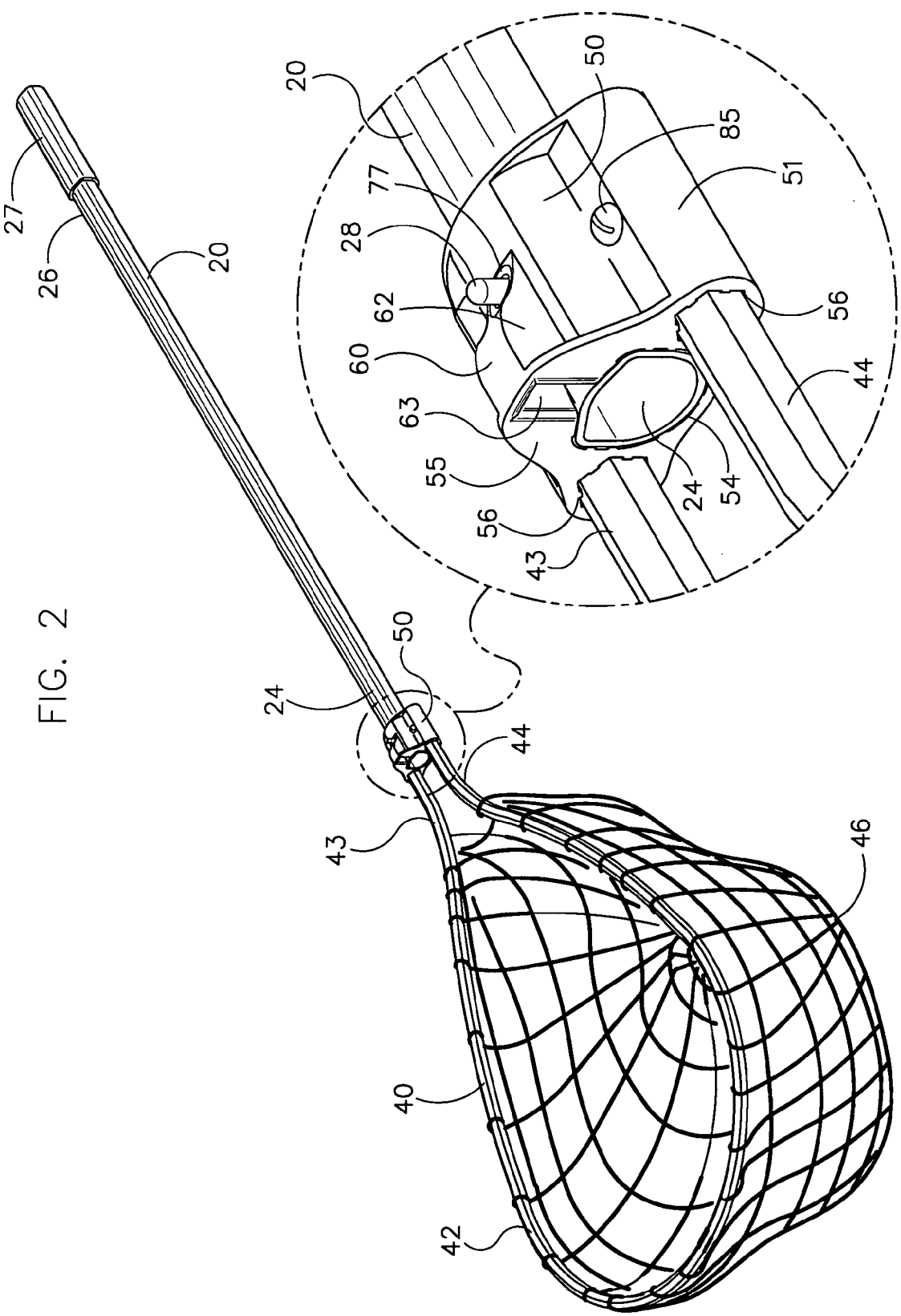
FIG. 2 is a front, top and right side perspective view of the landing net assembly shown in FIG. 1 and showing the assembly in its "active" or fully-extended position. It includes an enlarged inset view of the automatic landing yoke as well.

Referring now to the drawings in detail wherein like numbers represent like elements throughout, FIGS. 1 and 2 illustrate two similar perspective views of a landing net assembly, generally identified 10, that uses the preferred embodiment of a yoke 50 constructed in accordance with the present invention. More specifically, FIG. 1 illustrates the landing net assembly 10 in its "stored" or "net-retracted" position whereas FIG. 2 illustrates the assembly 10 in its "active" or "net-extended" position. FIGS. 1 and 2 each include an enlarged inset view of that area of interest relative to the automatic locking yoke 50 as well.

Figure 3A:
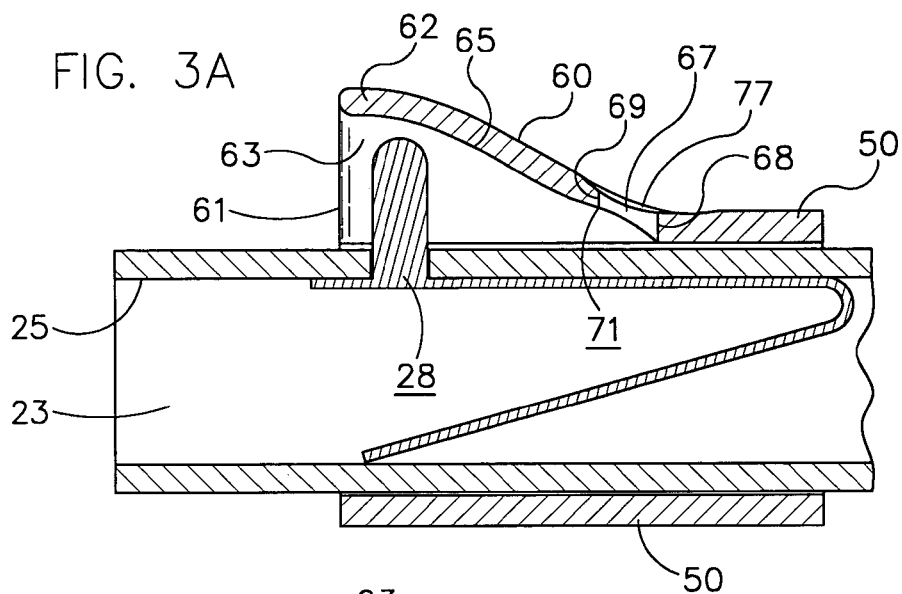
FIGS. 3A, 3B and 3C are further enlarged and cross-sectioned side elevational views of the automatic locking landing yoke and showing the yoke in various stages of engagement with the spring button of the handle.
Figure 3B:
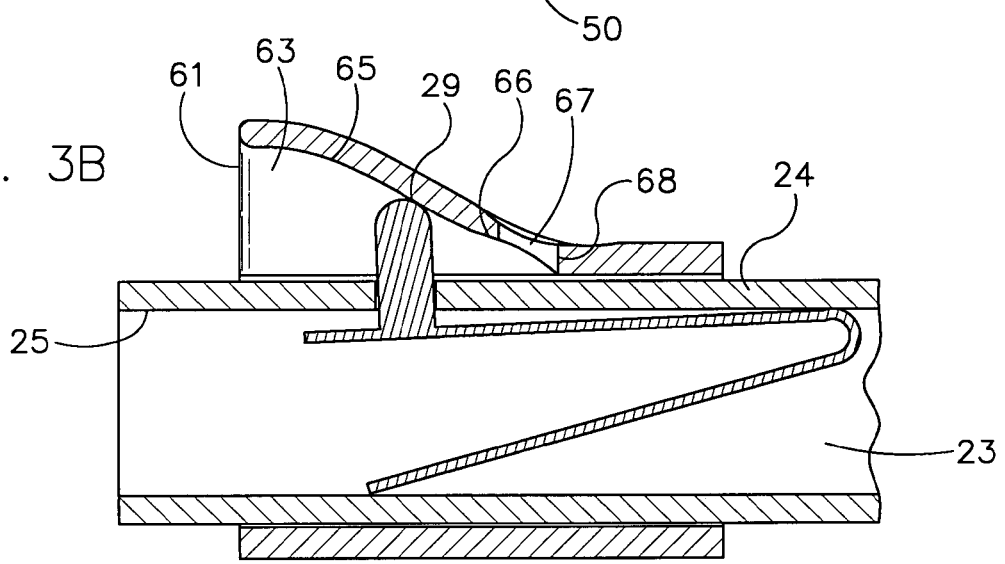
Figure 3C:
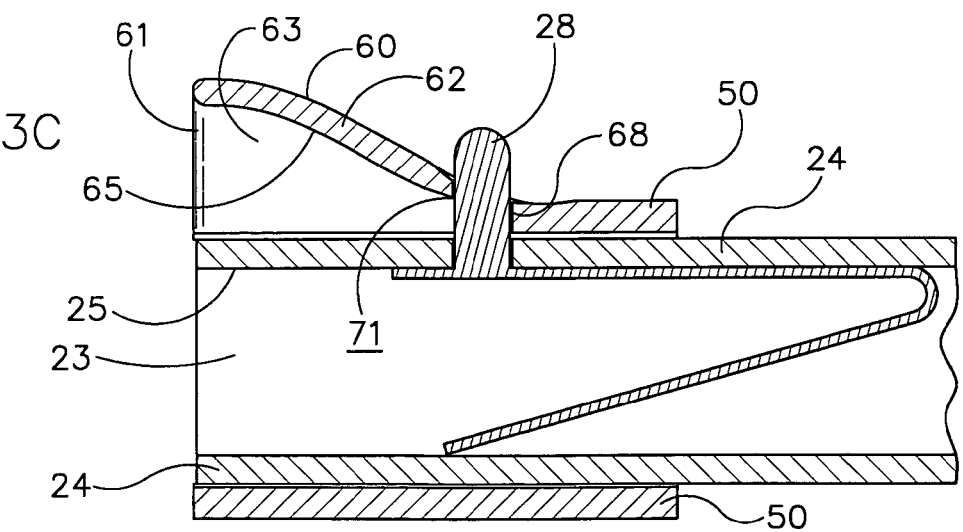

As shown, the landing net assembly 10 includes a handle 20 and a hoop 40. In their most basic relational functionality, the hoop 40 and the handle 20 are slidably movable relative to one another by virtue of the use of the yoke 50 of the present invention. Referring again to FIGS. 1 and 2, it will be seen that the handle 20 comprises a longitudinally-extending tubular shaft portion 22 having a distal portion 24 and a proximal portion 26. Although shown in tubular configuration, it is to be understood that the handle 20 could also be constructed of a solid piece of material without deviating from the scope of the present invention. The proximal shaft portion 26 may be covered by a handle grip 27 which reduces the likelihood of slippage of the handle 20 when the handle 20 is being used as intended. The distal shaft portion 24 includes a round-headed spring button 28. The spring button 28 is secured to an inner surface 25 of the shaft interior 23 such that the spring button 28 extends through a hole 25 defined within the handle 20. See FIGS. 3A through 3C. The spring button 28 is biased outwardly of the handle 20, but is depressible into the handle 20, but not all the way in.

Figure 4A:
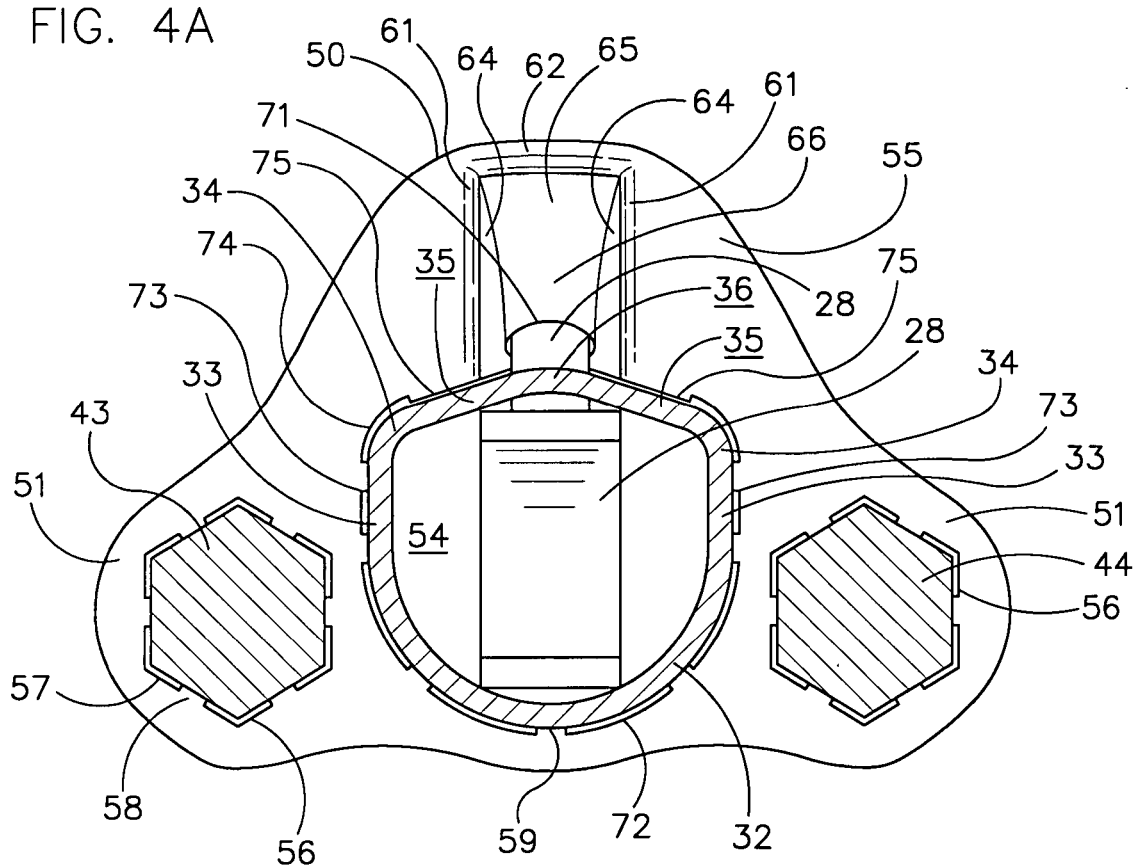
FIGS. 4A and 4B are still further enlarged and cross-sectioned front elevational views of the automatic locking landing yoke and showing how the yoke of the preferred embodiment is uniquely configured for use with alternatively configured handle and hoop profiles.
Figure 4B:
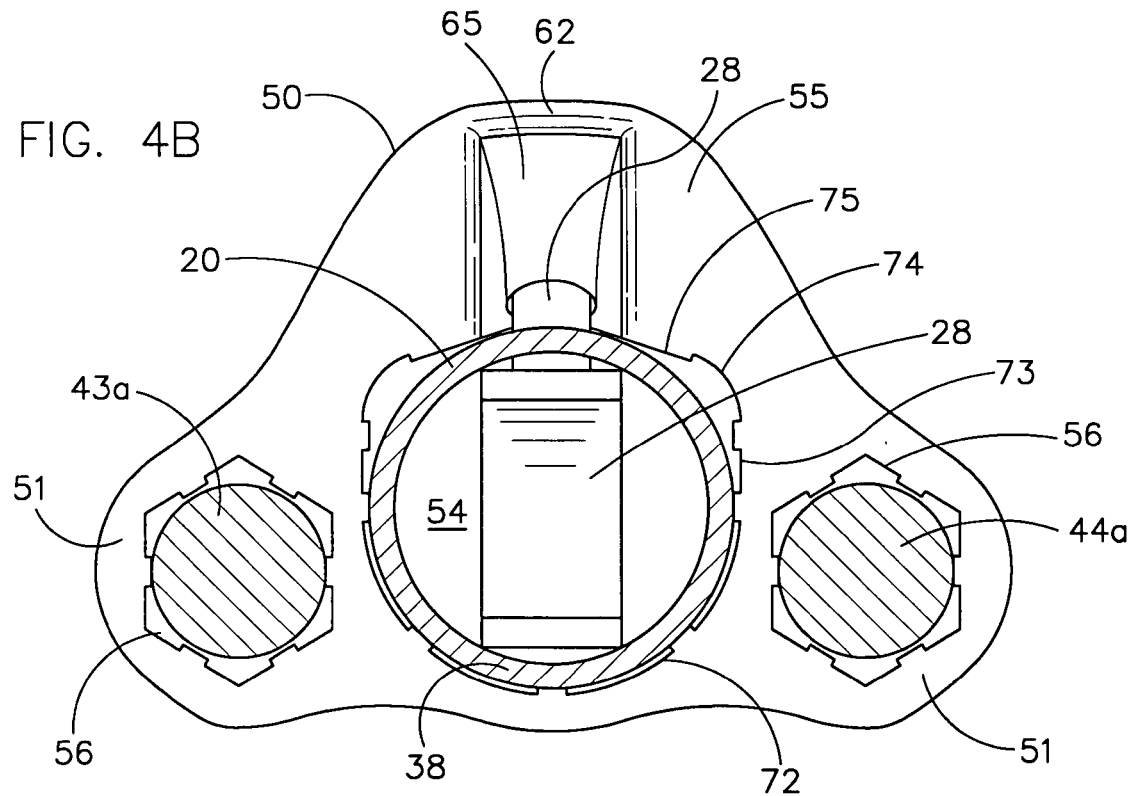

As shown in FIG. 4A, the handle 20 is configured, in one embodiment, in a unique cross-sectional tubular configuration that includes a substantially rounded and semi-circular bottom contour 32, a pair of opposing, tangentially and upwardly extending flat side walls 33, a pair of opposing and rounded shoulder portions 34, and a pair of slightly upwardly extending flat upper walls 35, the upper walls 35 connecting at a slightly curved peak portion 36. The bottom contour 32, the side walls 33, the shoulder portions 34, the upper walls 35 and the peak portion 36 all forming a longitudinally-extending handle surface continuum. In another embodiment, as shown in FIG. 4B, the tubular handle 20 is formed in a more traditional and generally rounded cross-sectional 38 configuration. This feature and the significance of these alternate configurations will be discussed in more detail later in this detailed description.

The hoop 40 of the landing net assembly 10 includes a continuously-arcuate net support portion 42 having a first end 43 and a second end 44. Attached to the net support portion 42 is a fish-retaining net 46. The net 46 can be made of a flexible plastic material, corded nylon, or any other material without deviating from the scope of the invention. It is not a limitation of the present invention. It is also to be understood that the shape of the net support portion 42 could assume any shape without deviating from the scope of the present invention. In other words, the shape of the net support portion 42, the length of its perimeter, the material that it is made from, etc. are not limitations of the present invention. The hoop 40 should, however, be of sufficient strength and rigidity to allow the net 46 to be properly supported when the net 46 contains a fish in it. It is possible, however, that the cross-sectional shape of the net support portion 42, and particularly that of its ends 43, 44 may assume different shapes, including a generally hexagonal shape as shown in FIG. 4A and a generally circular shape 43a, 44a as shown in FIG. 4B. This feature will also be discussed in more detail later in this detailed description.

The yoke 50 of the present invention includes a generally symmetrical yoke body 52 having a centrally-disposed handle cavity 54 and a pair of opposing and identically—configured hoop cavities 56 disposed in lateral yoke portions 51 to either side of the handle cavity 54. See FIGS. 4A and 4B. In both of those figures, it will be seen that the handle cavity 54 is configured in a unique cross-sectional configuration that substantially matches that of the first-described embodiment of the cross-sectional shape of the handle 20. That is, it includes a substantially rounded and semi-circular bottom contour 72, a pair of opposing, tangentially and upwardly extending flat side walls 73, a pair of opposing and rounded shoulder portions 74, and a pair of slightly upwardly extending flat upper walls 75, the upper walls 75 connecting into an opening 63. The bottom contour 72, the side walls 73, the shoulder portions 74, and the upper walls 75, all forming a longitudinally-extending handle-receiving surface continuum. Note also that the handle cavity 54 includes a number of handle supporting stubs 59 that extent slightly inwardly of the cavity 54.

The yoke 50 also includes a front face 55 and an upper yoke body portion 60 that includes a yoke ramp 62. The yoke ramp 62 includes a yoke ramp opening 63, opposed interior sidewalls 64, and an interior ramp surface 65, the ramp surface 65 tapering downwardly from the front face 55 of the yoke body 52. Disposed toward the bottommost portion 66 of the ramp surface 65 is a yoke button hole 67, the yoke button hole 67 being configured to receive the rounded spring button 28 within it. See FIG. 3C. The yoke button hole 67 is also uniquely configured to have a back surface 68 and a front surface 69, the front surface having a point 71 that coincides with the lowest point of travel of the uppermost portion 29 of the spring button 28. To aid in manual depression of the spring button 28 to release the button 28 from the hole 67, the hole 67 is surrounded by a circumferential indent 77 that roughly matches the curvature of a user's thumb. In the preferred embodiment, the yoke ramp opening 63 includes rounded side edges 61, the purpose of which is to guide the spring button into the opening 63. The yoke 50 of the preferred embodiment is made of a polymer material, such as polypropylene. This material provides a yoke 50 that is lightweight, durable and not susceptible to corrosion.

In application, the hoop 40 is pre-attached to the yoke 50 such that the ends 43, 44 of the net support portion 42 are inserted into the hoop cavities 56. The ends 43, 44 are secured by fasteners 85 inserted into apertures (not shown) that are defined within each of the lateral yoke portions 51. As shown in FIGS. 4A and 4B it will be noted that the cross-sectional shape of the hoop ends 43, 44 may be hexagonal or circular, the cross-sectional shape of the hoop cavities 56 each being generally hexagonal with longitudinally-extending stubs 58 being disposed at the approximate center of each of the sides 57 of the hexagonal shaped cavity 56 and also extending slightly inwardly of the cavity 56.

The handle 20 is also slidably pre-attached to the yoke 50 by insertion into and through the handle cavity 54. This is accomplished by manually depressing the spring button 28 below the surface 34 of the handle 20. The landing net assembly 10 is transported in its stored position as shown in FIG. 1 or readied for use in its active position as shown in FIG. 2. To move the handle 20 from its position as shown in FIG. 1 to its position as shown in FIG. 2 in the situation where the cross-sectional shape of the handle shaft 22 is as shown in FIG. 4A, and as previously described, the user needs only to pull the handle 20 rearwardly through the yoke 50. In this configuration, the user need not worry about rotation of the yoke 50 about the handle 20 since such is not possible. As the user pulls the handle 20 through the yoke 50, the spring button 28, which is biased to extend fully outwardly of the handle 20, is guided into the yoke ramp opening 63. See FIG. 3A. As this movement continues, the uppermost portion 29 of the spring button 28 engages the interior ramp surface 65 of the yoke 50 and slides along it, urging the spring button 28 further downwardly. See FIG. 3B. As the uppermost portion 29 of the spring button 28 passes beneath the lowermost point 71 of the front surface 69 of the yoke button hole 67, the spring button 28 is pushed inwardly of the handle 20 to its greatest extent. As the spring button 28 passes this point 71, the spring button "pops up" and into the yoke button hole 67, the back surface 68 of the hole 67 limiting the rearward movement of the button 28. See FIG. 3C. In this position, the landing net assembly 10 can be used for its intended purpose.

To return the assembly to its stored position, the user inserts his or her thumb into the circumferential indent 77 of the yoke button hole 67 at the same time pushing the spring button 28 inwardly of the yoke 50 and urging the handle 20 forwardly. Upon clearance of the lowermost point 71 of the front surface 69 of the yoke hole 67, the spring button will move forwardly and along the surface 65 of the yoke ramp 62, eventually exiting the yoke ramp opening 63 and returning the assembly to its position as shown in FIG. 1.

In the case where the handle cross-sectioned shape is generally circular, as shown in FIG. 4B, the operation of the assembly 10 is similar. The exception is that, given the ability of the circular cross-sectioned handle 20 to rotate within the handle cavity 54 of the yoke 50, the user must manually align the spring button 28 with the yoke ramp opening 63. The rounded edges 61 of this opening 63 aid the user in this step. Absent this alignment, it is impossible for the spring button 28 to be automatically depressed in any other rotational position which would otherwise risk complete disconnection of the yoke 50 from the handle 20. Once aligned properly, the movement of the handle 20 relative to the yoke 50, and the movement of the spring button 28 within the yoke ramp 62, are the same as previously described as is the release of the handle 20 therefrom.

Based upon the foregoing, it will be seen that there has been provided a new and useful automatic landing net yoke whereby the handle can be slid into a fixed position without manually activating the spring button, thus making the net easier and quicker to use; whereby the yoke does not allow the spring button to miss the hole, thus making the net more reliable in its use; whereby the yoke geometry allows multiple shapes of hoops and handles to be used, thus making the yoke design much more valuable due to manufacturability; whereby the yoke of such design is manufactured of a material that does not allow corrosion or oxidation between the yoke and the handle; and whereby a yoke is provided that is lightweight, strong, and no more expensive to produce than currently available parts are, thus making the yoke useful and affordable.

The principles of this invention having been fully explained in connection with the foregoing, I hereby claim as my invention:

1. An automatic landing net yoke for use with an extensible handle and a net hoop, the handle having a distal end and a spring button disposed within the distal end, the spring button being depressible within the handle, and the net hoop having hoop ends, which comprises a yoke body, the yoke body having a front face, an upper yoke body portion and a pair of opposing lateral yoke portions, a handle cavity defined within the yoke body for receiving a portion of the handle within it, a pair of opposing hoop cavities, each hoop cavity being disposed within a lateral yoke portion and to either side of the handle cavity, each hoop cavity being configured to receive a hoop end within it, a yoke ramp defined within the upper yoke body portion, the yoke ramp comprising a yoke ramp opening defined within the front face of the upper yoke body portion, opposed interior sidewalls extending rearwardly of the front face, and an interior ramp surface, the ramp surface tapering downwardly from the front face, and an aperture defined within the yoke ramp, wherein the yoke ramp slidingly engages the spring button and the interior ramp surface forces the spring button inwardly of the handle as the handle is pulled through the handle cavity of the yoke.

2. The automatic landing net yoke of claim 1 wherein the yoke aperture defined within the yoke ramp includes a back surface for preventing the spring button from rearward travel beyond the back surface.

3. The automatic landing net yoke of claim 2 wherein the handle has an upper surface and the yoke aperture defined within the yoke ramp includes a front surface, the front surface having a point that coincides with the lowest point of downward travel of the spring button, which point is above the upper surface of the handle.

4. The automatic landing net yoke of claim 3 wherein the yoke aperture is surrounded by a circumferential indent to aid in manual depression of the spring button to release the spring button from the yoke aperture.

5. The automatic landing net yoke of claim 3 wherein the handle cavity defined within the yoke body is configured to slidably receive a handle within it wherein the handle has a cross-sectional profile that includes a substantially rounded and semi-circular bottom contour, a pair of opposing, tangentially and upwardly extending flat side walls, a pair of opposing and rounded shoulder portions, a pair of slightly upwardly extending flat upper walls and a slightly curved peak, all of which forms a handle surface continuum.

6. The automatic landing net yoke of claim 5 wherein the yoke handle cavity has a cross-sectional profile that includes a substantially rounded and semi-circular bottom contour, a pair of opposing, tangentially and upwardly extending flat side walls, a pair of opposing and rounded shoulder portions, and a pair of slightly upwardly extending flat upper walls that terminate at the ramp yoke opening.

7. The automatic landing net yoke of claim 6 wherein the handle cavity of the yoke body includes a plurality of handle support stubs extending inwardly of the cavity.

8. The automatic landing net yoke of claim 6 wherein the handle cavity configuration is also functionally adapted to receive a handle within it wherein the handle has a generally circular cross-sectional profile.

9. The automatic landing net yoke of claim 8 wherein the yoke ramp opening defined within the face of the yoke includes rounded edges to facilitate receipt of the spring button therewithin.

10. The automatic landing net yoke of claim 3 wherein each of the hoop cavities defined within the lateral portions of the yoke body is configured to receive a hoop end that is generally hexagonal in cross-section.

11. The automatic landing net yoke of claim 10 wherein each of the hoop cavities includes a plurality of hoop support stubs extending inwardly of the cavity.

12. The automatic landing net yoke of claim 10 wherein each of the hoop cavities defined within the lateral portions of the yoke body is also configured to receive a hoop end that is generally circular in cross-section.

13. The automatic landing net yoke of claim 3 wherein the yoke body is made of a polymer.

14. The automatic landing net yoke of claim 3 wherein the spring button is formed of a single piece of resilient metal material.

15. The automatic landing net yoke of claim 3 wherein each of the lateral yoke portions include an aperture and a fastener for fixing the hoop end within the hoop cavity.

* * * * *